US012657234B2

(12) United States Patent
Fallihee et al.

(10) Patent No.: US 12,657,234 B2
(45) Date of Patent: Jun. 16, 2026

(54) METHOD AND SYSTEM FOR HEURISTIC-BASED CLASSIFICATION OF SOFTWARE DISCOVERED CONNECTED DEVICES

(71) Applicants: Michael Fallihee, Helena, MT (US); Sridhar Chandrashekar, Sammamish, WA (US); Mohan Thimmappa, Redmond, WA (US)

(72) Inventors: Michael Fallihee, Helena, MT (US); Sridhar Chandrashekar, Sammamish, WA (US); Mohan Thimmappa, Redmond, WA (US)

( * ) Notice: Subject to any disclaimer, the term of this patent is extended or adjusted under 35 U.S.C. 154(b) by 0 days.

(21) Appl. No.: 18/381,168

(22) Filed: Oct. 17, 2023

(65) Prior Publication Data

US 2024/0160654 A1     May 16, 2024

Related U.S. Application Data

(63) Continuation-in-part of application No. 18/239,102, filed on Aug. 28, 2023.

(60) Provisional application No. 63/402,295, filed on Aug. 30, 2022.

(51) Int. Cl.
*G06F 16/383* (2019.01)
(52) U.S. Cl.
CPC .................................. *G06F 16/383* (2019.01)
(58) Field of Classification Search
USPC ........................................................ 707/748
See application file for complete search history.

(56) References Cited

U.S. PATENT DOCUMENTS

| | | | | |
|---|---|---|---|---|
| 7,609,402 | B2 * | 10/2009 | Chang | G06F 3/0481 |
| | | | | 358/1.14 |
| 8,626,675 | B1 * | 1/2014 | Satish | G06N 5/01 |
| | | | | 706/12 |
| 10,108,791 | B1 * | 10/2018 | Masterman | G06F 21/316 |
| 11,307,863 | B1 * | 4/2022 | Patterson | G06N 3/063 |
| 2002/0097415 | A1 * | 7/2002 | Chang | H04N 1/00307 |
| | | | | 358/1.13 |
| 2006/0052923 | A1 * | 3/2006 | Farmer | B60R 21/01538 |
| | | | | 701/45 |
| 2007/0025534 | A1 * | 2/2007 | Yezhuvath | H04M 15/00 |
| | | | | 379/114.14 |
| 2009/0187533 | A1 * | 7/2009 | Butler | H04L 41/08 |
| 2012/0182873 | A1 * | 7/2012 | Shah | G06Q 10/06 |
| | | | | 370/241 |
| 2015/0242406 | A1 * | 8/2015 | Singh | G06F 16/24578 |
| | | | | 707/723 |
| 2016/0224897 | A1 * | 8/2016 | Wang | G06N 5/022 |

(Continued)

*Primary Examiner* — Hasanul Mobin

(57) ABSTRACT

In one aspect, a computerized method for heuristic-based classification of software discovered connected devices, comprising: implementing a discovery process on a set of devices and obtain a set of attributes of each device; identify a set of heuristics, wherein the set of heuristics combines an attribute from each discovered asset of the set of devices with an associated weight; comparing the attribute from each asset and the device catalog and using the weight to determine a partial match score; using the set of heuristics to reduce a search space used to identify the candidates for a friendly name of each device; and calculating a dot product of the weight of each of the heuristics and using the dot product to identify a set of candidate devices in the device catalog.

8 Claims, 6 Drawing Sheets

(56)          References Cited

U.S. PATENT DOCUMENTS

| | | | |
|---|---|---|---|
| 2017/0092262 A1* | 3/2017 | Pinhasi | G10L 15/02 |
| 2017/0103337 A1* | 4/2017 | Cao | G06F 16/2455 |
| 2018/0157645 A1* | 6/2018 | Avkd | G06Q 10/1053 |
| 2019/0122258 A1* | 4/2019 | Bramberger | G06Q 30/0248 |
| 2020/0302332 A1* | 9/2020 | Contreras | G06N 5/01 |
| 2021/0350463 A1* | 11/2021 | Haynes, III | G06Q 40/06 |
| 2022/0067456 A1* | 3/2022 | Johnson | G06F 18/2155 |
| 2022/0101161 A1* | 3/2022 | Goel | G06N 20/00 |
| 2022/0291673 A1* | 9/2022 | Ema | G05B 23/0283 |
| 2023/0071971 A1* | 3/2023 | Bergen | G06N 20/00 |
| 2023/0191821 A1* | 6/2023 | Balasubramanian | B42D 25/23 |
| | | | 235/380 |
| 2023/0319094 A1* | 10/2023 | Bakman | G06F 21/577 |
| | | | 726/25 |
| 2024/0004886 A1* | 1/2024 | Cooley | G06F 16/24578 |
| 2024/0119079 A1* | 4/2024 | Yano | G06F 16/383 |
| 2024/0160654 A1* | 5/2024 | Fallihee | G06F 16/383 |

* cited by examiner

PROGRAMMATICALLY SUPPLEMENT DISCOVERED DEVICE
INFORMATION USING CLASSIFICATION
102

MATCH DISCOVERED DEVICE TO AN EXISTING DEVICE IN A DEVICE
CATALOG USING PROBABILISTIC INFORMATION MATCHING COMBINED
WITH DOMAIN SPECIFIC HEURISTICS
104

100

| Manufacturer | Model Number | Category | Device Friendly Name |
|---|---|---|---|
| Alerton | BCM-ETH | Building Controller | unavailable |
| Schneider Electric | FDP221 | Fire Detection | acme_fire |
| Siemens | 7KM2111 | Power Distribution | Power Siemens Second floor |
| Honeywell | 301-C-DLC-BIP | Gas Detection | unavailable |

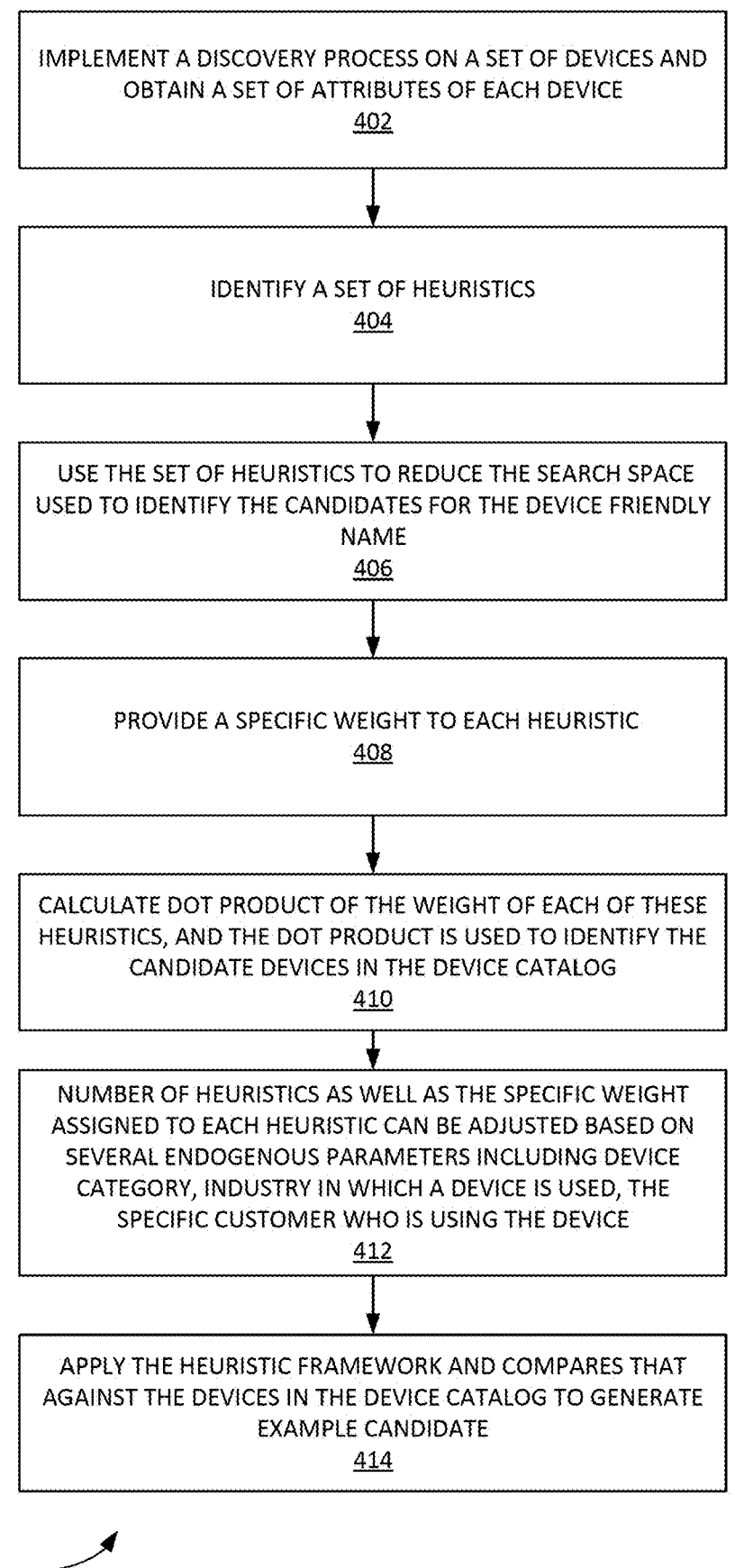

IMPLEMENT A DISCOVERY PROCESS ON A SET OF DEVICES AND OBTAIN A SET OF ATTRIBUTES OF EACH DEVICE
402

IDENTIFY A SET OF HEURISTICS
404

USE THE SET OF HEURISTICS TO REDUCE THE SEARCH SPACE USED TO IDENTIFY THE CANDIDATES FOR THE DEVICE FRIENDLY NAME
406

PROVIDE A SPECIFIC WEIGHT TO EACH HEURISTIC
408

CALCULATE DOT PRODUCT OF THE WEIGHT OF EACH OF THESE HEURISTICS, AND THE DOT PRODUCT IS USED TO IDENTIFY THE CANDIDATE DEVICES IN THE DEVICE CATALOG
410

NUMBER OF HEURISTICS AS WELL AS THE SPECIFIC WEIGHT ASSIGNED TO EACH HEURISTIC CAN BE ADJUSTED BASED ON SEVERAL ENDOGENOUS PARAMETERS INCLUDING DEVICE CATEGORY, INDUSTRY IN WHICH A DEVICE IS USED, THE SPECIFIC CUSTOMER WHO IS USING THE DEVICE
412

APPLY THE HEURISTIC FRAMEWORK AND COMPARES THAT AGAINST THE DEVICES IN THE DEVICE CATALOG TO GENERATE EXAMPLE CANDIDATE
414

| Heuristic Name | Case Sensitivity | Weight |
|---|---|---|
| manufacturer_name | case_insensitive | 0.7 |
| model_number | case_insensitive | 0.2 |
| product_name | case_insensitive | 0.1 |

500

| Device Catalog Name | Manufacturer | Probability |
|---|---|---|
| Visual Logic Controller | Alerton | 0.946 |
| Advanced VLC | Alerton | 0.933 |
| Visual Logic Display | Alerton | 0.925 |
| VLX Platinum | Alerton | 0.88 |

600

METHOD AND SYSTEM FOR HEURISTIC-BASED CLASSIFICATION OF SOFTWARE DISCOVERED CONNECTED DEVICES

CLAIM OF PRIORITY

This application claims priority to U.S. Provisional Patent Application No. 63/402,295, filed on Aug. 30, 2022 and titled heuristic-based classification of software discovered connected devices. This provisional patent application is hereby incorporated by reference in its entirety.

This application claims priority to U.S. Provisional patent application Ser. No. 18/239,102, filed on Aug. 28, 2023 and titled Method and Systems for Cloud Security Operations. This utility patent application is hereby incorporated by reference in its entirety.

U.S. Provisional patent application Ser. No. 18/239,102 claims priority to U.S. Provisional Patent Application No. 63/402,295, filed on Aug. 30, 2022 and titled heuristic-based classification of software discovered connected devices.

BACKGROUND

The information that is typically discovered programmatically from an industrial internet of things (IIoT) device contains a strict subset of the larger, relevant set of information that is required to effectively operationalize and manage the device at an industrial scale. The effort required to supplement that information historically has been unstructured and requires disproportionate manual effort which does not scale. There is a need for a mechanism that implement programmatic, automated classification of internet connected devices used by enterprises as part of their IIoT portfolio.

SUMMARY OF THE INVENTION

In one aspect, a computerized method for heuristic-based classification of software discovered connected devices, comprising: implementing a discovery process on a set of devices and obtain a set of attributes of each device; identify a set of heuristics, wherein the set of heuristics combines an attribute from each discovered asset of the set of devices with an associated weight; comparing the attribute from each asset and the device catalog and using the weight to determine a partial match score; using the set of heuristics to reduce a search space used to identify the candidates for a friendly name of each device; and calculating a dot product of the weight of each of the heuristics and using the dot product to identify a set of candidate devices in the device catalog.

BRIEF DESCRIPTION OF THE DRAWINGS

FIG. 3 illustrates an example table of discovered devices, according to some embodiments.

FIG. 4 illustrates an example process for heuristic-based classification of software discovered connected devices, according to some embodiments, according to some embodiments.

Figure 1:
FIG. 1 illustrates an example process for heuristic-based classification of software discovered connected devices, according to some embodiments.

The Figures described above are a representative set and are not an exhaustive with respect to embodying the invention.

DESCRIPTION

Disclosed are a system, method, and article of manufacture for heuristic-based classification of software discovered connected devices. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Cloud computing architecture refers to the components and subcomponents required for cloud computing. These components typically consist of a front-end platform (fat client, thin client, mobile), back-end platforms (servers, storage), a cloud-based delivery, and a network (Internet, Intranet, Intercloud). Combined, these components can make up cloud computing architecture. Cloud computing architectures and/or platforms can be referred to as the 'cloud' herein as well.

Cloud resource model (CRM) provides ability to define resource characteristics, Hierarchy, dependencies, and its action in a declarative model and embed them in Open API specification. CRM allows both humans and computers to understand and discover capabilities and characteristics of cloud service and its resources.

Distributed control system (DCS) is a computerized control system for a process or plant usually with many control loops, in which autonomous controllers are distributed throughout the system, but there is no central operator supervisory control. This is in contrast to systems that use centralized controllers; either discrete controllers located at a central control room or within a central computer. Hyperscalers can be large cloud service providers. Hyperscalers can be the owners and operators of data centers where these horizontally linked servers are housed.

Internet of things (loT) describes devices with sensors, processing ability, software and other technologies that connect and exchange data with other devices and systems over the Internet or other communications networks.

Industrial internet of things (IIoT) refers to interconnected sensors, instruments, and other devices networked together with computers' industrial applications, including manufacturing and energy management. This connectivity allows for data collection, exchange, and analysis, potentially facilitating improvements in productivity and efficiency as well as other economic benefits. The IIoT is an evolution of a distributed control system (DCS) that allows for a higher degree of automation by using cloud computing to refine and optimize the process controls.

Levenshtein distance is a string metric for measuring the difference between two sequences. In one example, the Levenshtein distance between two words can be the minimum number of single-character edits (e.g. insertions, deletions or substitutions) required to change one word into the other.

EXAMPLE SYSTEMS AND METHODS

A multi-cloud governance platform is provided that empowers enterprises to rapidly achieve autonomous and continuous cloud governance and compliance at scale. Multi-cloud governance platform is delivered to end users in the form of multiple product offerings, bundled for a specific set of cloud governance pillars based on the client's needs. Example multi-cloud governance platform's offerings and associated cloud governance pillars are now discussed.

The multi-cloud governance platform can provide FinOps as a solution offering that is designed to help an entity develop a culture of financial accountability and realize the benefits of the cloud faster. The multi-cloud governance platform SecOps as a solution offering designed to help keep cloud assets secure and compliant. The multi-cloud governance platform is a solution offering designed to help optimize cloud operations and cost management in order to provide accessibility, availability, flexibility, and efficiency while also boosting business agility and outcomes. The multi-cloud governance platform provides a Well-Architected Assessment functionality (e.g. CoreStack Assessments®, etc.) that is designed to help an entity adopt best practices according to well-architected frameworks, gain continuous visibility, and manage risk of cloud workloads with assessments, policies, and reports that allow an administrator to review the state of applications and get a clear understanding of risk trends over time.

Well-Architected Assessment functionality helps enterprises adopt cloud best practices, manage risk, and maintain reliable, secure, resilient, cost-efficient, performant, and sustainable cloud infrastructures.

Cloud Governance Pillars that can be implemented by the multi-cloud governance platform are now discussed. The multi-cloud governance platform can enable governing of cloud assets involves cost-efficient and effective management of resources in a cloud environment while adhering to security and compliance standards. There are several factors that can be involved in a successful implementation of cloud governance. The multi-cloud governance platform has encompassed all these factors into its cloud governance pillars. The following table explains the key cloud governance pillars developed by Multi-cloud governance platform.

The multi-cloud governance platform utilizes various operations that provide the capability to operate and manage various cloud resources efficiently using various features such as automation, monitoring, notifications, activity tracking.

The multi-cloud governance platform utilizes various security operations that enable management of the security governance of various cloud accounts and identify the security vulnerabilities and threats and resolve them.

The multi-cloud governance platform utilizes various manages cost. The multi-cloud governance platform enables users to create a customized controlling mechanism that can control a customer's cloud expenses within budget and reduce cloud waste by continually discovering and eliminating inefficient resources.

The multi-cloud governance platform utilizes various access operations. The multi-cloud governance platform utilizes various allows administrators to configure secure access of resources in a cloud environment and protect the users' data and assets from unauthorized access.

The multi-cloud governance platform utilizes various resource management operations. The multi-cloud governance platform enables users to define, enforce, and track the resource naming and tagging standards, sizing, and their usage by region. It also enables a customer to follow consistent and standard practices pertaining to resource deployment, management, and reporting.

The multi-cloud governance platform utilizes various compliance actions. The multi-cloud governance platform guides users to assess a cloud environment for its compliance status against standards and regulations that are relevant to an organization— ISO, NIST, HIPAA, PCI, CIS, FedRAMP, AWS Well-Architected framework, and custom standards.

The multi-cloud governance platform utilizes various self-service operations. The multi-cloud governance platform enables administrators to configure a simplified self-service cloud consumption model for end users that are tied to approval workflows. It enables an entity to automate repetitive tasks and focus on key deliverables.

The multi-cloud governance platform continuously assess the state of the customer's cloud workloads against well-architected frameworks to manage risk and embrace best practices. The multi-cloud governance platform includes a Well-Architected Assessment functionality that designed to help adopt best practices, gain continuous visibility, and manage risk for cloud workloads with assessments, policies, and reports that allow a customer to review the state of a customer's applications and get a clear understanding of risk trends over time. Further, it automatically discovers issues and provides actionable insights for remediation, simplifying and streamlining the process of assessing, improving, and maintaining cloud workloads. The multi-cloud governance platform can onboard cloud accounts and manage workloads. In this way, the multi-cloud governance platform supports well-architected frameworks (WAF).

The Well-Architected Assessment functionality helps ensure user workloads are optimized as part of a strong cloud strategy in the following key areas: automate discovery and remediate at scale discovering issues across best practice areas for user cloud workloads can be difficult and time-consuming, which is why the multi-cloud governance platform implements auto-discovery and remediation features. This helps improve user productivity for detecting any issues in a cloud account or workloads and provides those insights for you to look into and remediate at scale. The Well-Architected Assessment functionality can enable collaboration with multiple teams and enable gathering information and collecting evidence for best practices can present challenges around collaboration. Since it's usually not a single person doing the assessment, but a group of people across different teams, the multi-cloud governance platform provides built-in collaboration features to make assessing user workloads easier. The Well-Architected Assessment functionality can be used to validate across multi-cloud workloads. The multi-cloud governance platform helps make it possible to validate best practices across multiple clouds by providing a single pane of glass to do a well-architected review across diverse workloads. The multi-cloud governance platform also supports a multi-cloud well architected framework for workloads that span across more than one cloud provider. The Well-Architected Assessment functionality can classify best practices. Cloud best practices can fall into multiple categories. As part of the Well-Architected Assessment functionality, the multi-cloud governance platform provides built-in pillars respective to each cloud platform (AWS, Azure, etc.) that organize best practices into relevant areas of focus, such as operations, security, sustainability, and more. The multi-cloud governance platform include these pillars to helps users clearly define which areas they need to focus on and guide you in terms of next steps to move towards a well-architected cloud infrastructure.

The Well-Architected Assessment functionality can enable map policies to workloads best practices for different cloud platforms are reinforced in the multi-cloud governance platform by built-in policies, which are mapped directly to various best practices. These policies help identify any violations in a workload based on a particular best practice. Policies come pre-loaded and pre-mapped, but you can also create and map a customer's policies. This enables you to validate user workloads against best practices with more ease and control. Automate best practices even with built in best practice classification and policies, validating user workloads against best well-architected frameworks can still require manual work.

The multi-cloud governance platform the Well-Architected Assessment functionality maps relevant policies to identify violations against certain best practice and can automate most of the work needed to validate user workloads and identify any violations, reducing the amount of overhead and effort needed on a user. Built-in suggestions for remediation can be provided. For many of The multi-cloud governance platform's automated policies, any identified violations that appear as part of an assessment will come with a suggested remediation to address it. These suggestions appear directly to the user in the multi-cloud governance platform web portal, making it easy to both find and fix any issues with user cloud workloads.

Built-in evidence tracking is provided. The multi-cloud governance platform can keep track of what steps were taken to implement best practices and address any violations is a key part of the cloud optimization process. The multi-cloud governance platform the Well-Architected Assessment functionality can simplify and streamline this part of the process by providing built-in comment and file attachment features for each best practice item included in an assessment. Users can add evidence directly in the assessment to show what was done to meet certain best practices, as well as create a milestone once an assessment is complete to log a snapshot of a workload that can be referenced later.

Clear assessment workflow is implemented by the multi-cloud governance platform. Progress through assessments with ease with a built-in workflow that helps you ensure you follow each step of the assessment process and account for each best practice item along the way. The multi-cloud governance platform can start an assessment, go through the questions, remediate any violations it finds, then reach a finishing point where you're ready to create a milestone. Export assessment reports In addition to being able to monitor user assessment results directly in the multi-cloud governance platform web portal, you can also export results as reports (e.g. PDF or image file). This makes it easy to share the results of an assessment with other members of a team, or across departments.

The multi-cloud governance platform can integrate with AWS Well-Architected (WA). The multi-cloud governance platform the Well-Architected Assessment functionality supports one-directional integration with AWS Well-Architected, meaning it can send data directly from The multi-cloud governance platform to AWS. When a user completes an assessment, whatever best practices the user provides answers can be synced to AWS so that results show there as well. This is helpful for keeping information consistent across both The multi-cloud governance platform and AWS environments. The multi-cloud governance platform's mission is to not only help with assessing cloud posture, but to provide a clear path to realizing well-architected workloads. Heuristic-Based Classification of Software Discovered Connected Devices FIG. 1 illustrates an example process 100 for heuristic-based classification of software discovered connected devices, according to some embodiments. Process 100 can implement automated and programmatic classification of devices related to the IIoT using probabilistic information matching using domain specific heuristics.

In step 102, process 100 can programmatically supplement discovered device information using classification. In step 104, process 100 can match a discovered device to an existing device in a device catalog using probabilistic information matching combined with domain specific heuristics.

Probabilistic information matching is now discussed. Probabilistic matching is a statistical approach that relies on probabilities and/or permutations to determine a best match between two or more devices. In one example, probabilistic information matching can compare various device information field values are compared between two or more records and each field is assigned a weight that indicates a similarity of match between the two or more field values. The field weights can be summed and thus indicate a probability of a match between two or more fields of device information.

Figure 2:
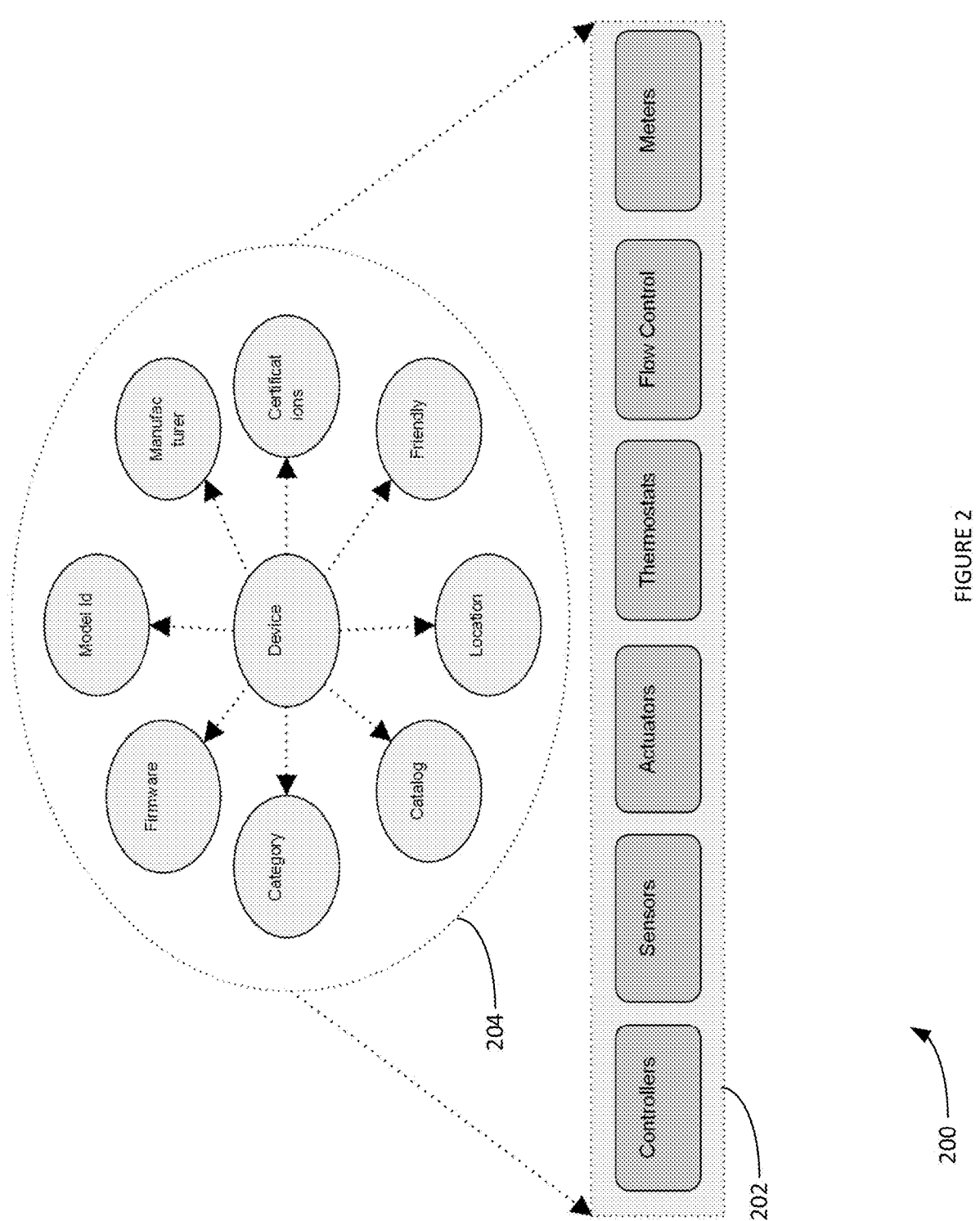
FIG. 2 illustrates an example schema for an IIOT device, according to some embodiments.

FIG. 2 illustrates an example schema 200 for an IIOT device, according to some embodiments. Schema 200 can include an IIOT device and is representative of the information that can be included in a device catalog for said devices. More specifically, 202 shows example IOT assets. These are assets that can be discovered through various protocols and basic attributes are known. Assets share common attributes which are broken down in 204. Some of these attributes, like manufacturer or model number, are discovered automatically. Others are added to enrich the data after matching to a device in the catalog.

FIG. 3 illustrates an example table 300 of discovered devices, according to some embodiments. Table 300 shows set of devices that were programmatically discovered within a facility. As part of the discovery process, the devices provide a set of attributes as shown.

FIG. 4 illustrates an example process 400 for heuristic-based classification of software discovered connected devices, according to some embodiments, according to some embodiments. In step 402, process 400 implements a discovery process on a set of devices and obtains a set of attributes of each device. This information can be stored in a data table such example table 300.

It is noted that while the information regarding the manufacturer, model number and category information is standardized per the taxonomy laid out by the manufacturer or the device category, the friendly name does not follow a standard taxonomy, is unstructured and has a specific context that is esoteric to all but the entity that programmed it. Yet, the friendly name is the key identifier used by operational teams to identify a device and it typically has an informal taxonomy that is specific to the facility in question or the context in which the device is used.

A device catalog is a repository of information regarding a multitude of devices that could be indexed by device category, manufacturer, industry or any other key pivot. The device catalog contains additional device attributes (e.g. above and beyond the information that a device shares via programmatic device discovery) that includes information such as user manuals, recall information, device images etc. that provide additional value to an operations team.

The key problem to solve here is that the friendly name supplied by the device does not map directly to the name the device has in the device catalog. In several cases, the device may not have a friendly name associated with it. Additionally, the device catalog contains tens of millions of devices so trying to map a specific device to its equivalent counterpart in the device catalog using manual means is laborious and therefore cannot scale unless there is a programmatic solution.

In step 404, process 400 identifies a set of heuristics. In its simplest form, the heuristics would combine an attribute from the discovered asset with a weight. When matching against catalog you compare the attribute from the asset and use the weight to determine a partial match score. Heuristics could take many forms though, including more complex logic combining multiple attributes (e.g. if manufacturer="Alerton" and model_number="XXX" then match using description attribute). Heuristics can be experimentally discovered and refined.

In step 406, process 400 uses the set of heuristics to reduce the search space used to identify the candidates for the device friendly name. Heuristics reduce the search space by giving a numerical score to potential matches. Process 400 can exclude anything under a particular threshold score. When comparing attributes between the catalog and the discovered asset, multiple methods can be employed (e.g. exact text match, Levenshtein distance, etc.) to determine a match. This match combined with a weight gives a partial score. When all heuristics are applied, a final score is determined for each potential match in the catalog, and process 400 can look at matches above a certain threshold.

Process 400 can do this efficiently by clever use of data structures and ordering of the heuristics, certain attributes such as manufacturer have high weight and can thus greatly reduce the search space.

In step 408, process 400 provides a specific weight to each heuristic (e.g. such that each heuristic has a specific weight associated with it). This weight helps identify the importance that a specific heuristic has for the overall determination of the candidates. Weights can be determined through experimentation and a refinement process. Running the process over a dataset and validating the results, tuning the weights to match customer expectations.

In step 410, process 400 calculates the dot product of the weight of each of these heuristics, and the dot product is used to identify the candidate devices in the device catalog.

It is noted that the number of heuristics as well as the specific weight assigned to each heuristic can be adjusted based on several endogenous parameters including device category, industry in which a device is used, the specific customer who is using the device, etc. in step 412.

Figure 5:
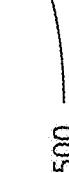
FIG. 5 illustrates an example table showing example heuristics and associated weights with an example device, according to some embodiments.

FIG. 5 illustrates an example table 500 showing example heuristics and associated weights with an example device, according to some embodiments. In the present example, it can be assumed that an entity would like to locate the "Alerton" device in table 500. Process 400 can create the following heuristics and associated the following weights with it (e.g. as shown in table 500).

Figure 6:
FIG. 6 illustrates an example table with confidence levels which are expressed in the form of a probability value, according to some embodiments.

FIG. 6 illustrates an example table with confidence levels which are expressed in the form of a probability value, according to some embodiments. Process 400 applies the heuristic framework and compares that against the devices in the device catalog to generate example candidate in step 414. Each device candidate has a confidence level that is expressed in the form of a probability of match as shown in the example column of table 600.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by this United States patent:

1. A computerized method for heuristic-based classification of software discovered connected devices, comprising:

implementing a discovery process on a set of devices and obtaining a set of attributes of each device, wherein each device comprise an industrial internet of things (IIOT) device;

identify a set of heuristics, wherein the set of heuristics combines an attribute from each discovered asset of the set of devices with an associated weight;

comparing the attribute from each asset and the device catalog and using the weight to determine a partial match score;

using the set of heuristics to reduce a search space used to identify the candidates for a friendly name of each device; and calculating a dot product of the weight of each of the heuristics and using the dot product to identify a set of candidate devices in the device catalog, wherein the set of attributes of each device is stored in a data table, wherein the set of attributes of each device comprises a friendly name of each device that does not follow a standard taxonomy as provided in a device catalog, wherein the friendly name is unstructured data and has a specific context that is esoteric to all but an entity that programmed the friendly name, wherein the friendly name comprises a key identifier used by an operational team to identify a device, wherein the friendly name comprises an informal taxonomy that is specific to a facility or a context in which the device with the friendly name is used, and wherein a Levenshtein distance is used to compare each attribute between the device catalog and the discovered asset, calculating a confidence level of each of the set of candidate devices and expressing the confidence level in the form of a probability value, and wherein each device candidate has a confidence level that is expressed in the form of a probability of match, and wherein at least one heuristic comprises a conditional logic expression combining multiple attributes of the discovered asset, including a rule of the form "IF manufacturer=X AND model number=Y THEN apply a description-based comparison, wherein the set of heuristics is experimentally derived and iteratively refined based on validation results from previously classified devices, and wherein at least one heuristic assigns a disproportionately high weight to an attribute selected from manufacturer, model number, or device category to reduce the search space.

2. The computerized method of claim 1, wherein the heuristics comprises a logic combining multiple attributes.

3. The computerized method of claim 2, wherein the device catalog comprises plurality of devices and does not include a friendly name for each device.

4. The computerized method of claim 3, wherein the heuristics reduces the search space by giving a numerical score to potential matches.

5. The computerized method of claim 4, further comprising:

providing a specific weight to each heuristic such that each heuristic has a specific weight associated with the heuristic.

6. The computerized method of claim 5, further comprising:

providing the specific weight to each heuristic such that weight is used identify the importance that a specific heuristic has for the overall determination of the candidates.

7. The computerized method of claim 6, wherein a plurality of heuristics are provided and wherein a specific weight is assigned to each heuristic, and wherein each heurist is adjusted based on a plurality of endogenous parameters.

8. The computerized method of claim 7, plurality of endogenous parameters comprises a device category, an industry in which a device is used, and a specific customer who is using the device.

* * * * *